Nov. 17, 1959     M. MAXIMOV     2,912,782
SEA-FISHING KITE
Filed March 5, 1958     2 Sheets-Sheet 1
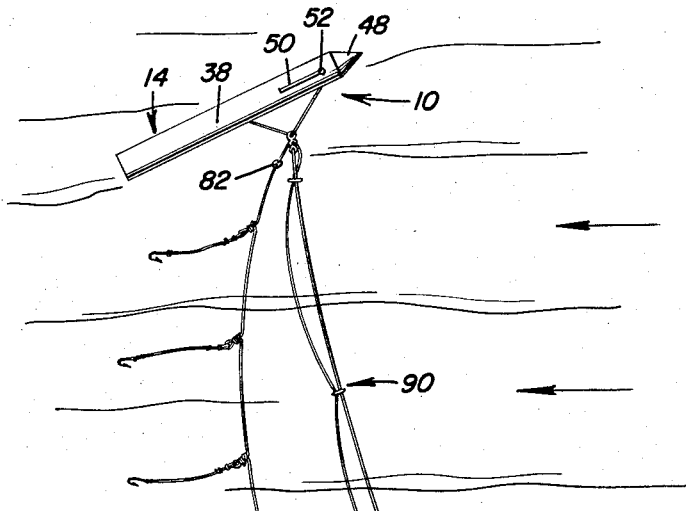
Fig. 1
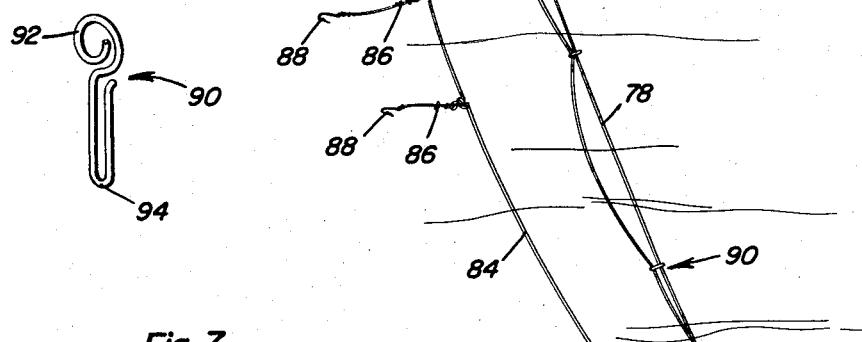
Fig. 6
Fig. 7
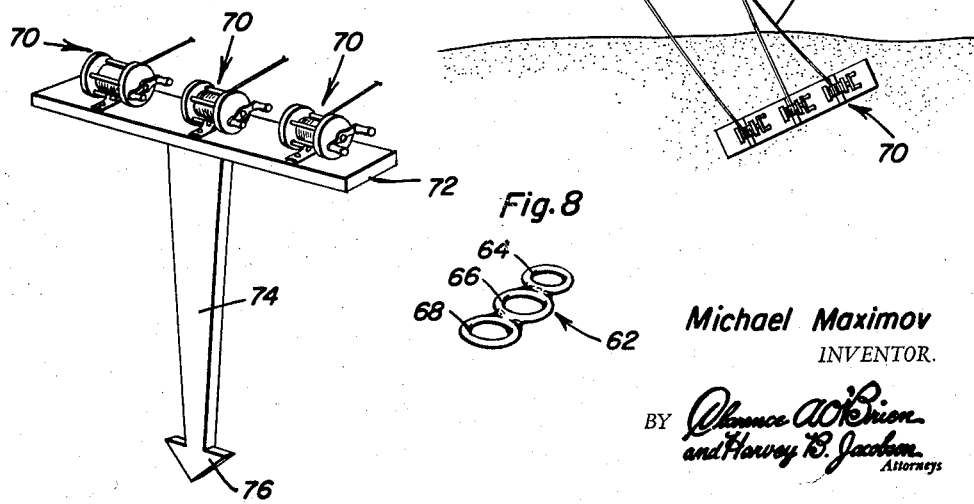
Fig. 8
Michael Maximov
INVENTOR.
BY *Clarence A. O'Brien*
*and Harvey B. Jacobson*
Attorneys Nov. 17, 1959 M. MAXIMOV 2,912,782
SEA-FISHING KITE
Filed March 5, 1958 2 Sheets-Sheet 2
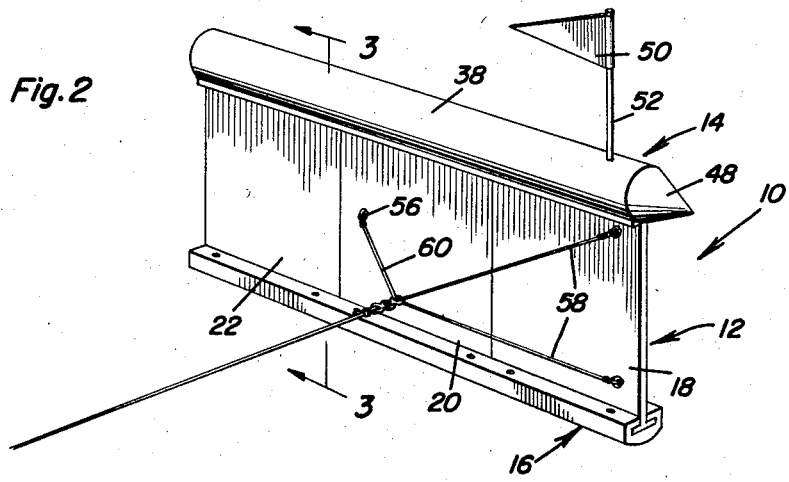
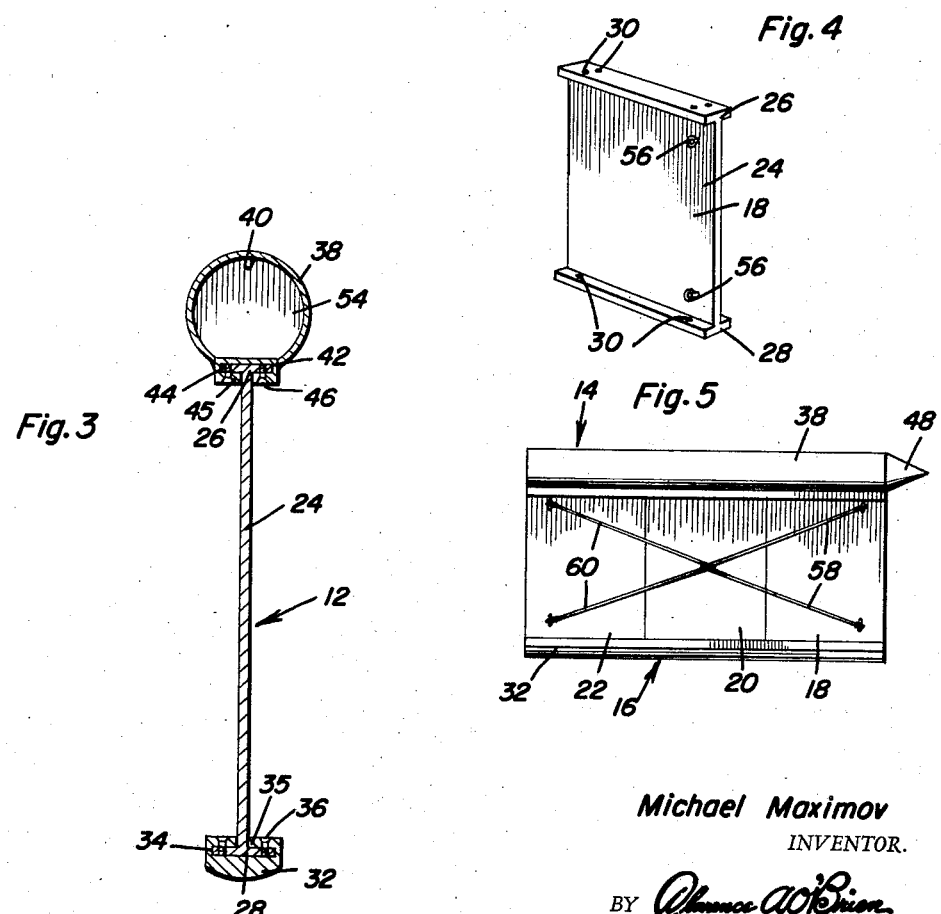
Michael Maximov
INVENTOR.

United States Patent Office 2,912,782
Patented Nov. 17, 1959

2,912,782

SEA-FISHING KITE

Michael Maximov, Jacksonville, Fla.

Application March 5, 1958, Serial No. 719,434

5 Claims. (Cl. 43—27.2)

This invention relates generally to fishing tackle, and more particularly to a sea fishing kite and shore controlled lines therefor.

The primary object of this invention is to provide a sea fishing kite which may be controlled from the shore and set out into a body of water, whereby lines may be affixed thereto having lures and fishing hooks extending therefrom, so that fishing in deep water may be accomplished without the necessity of using a boat or of stringing a line across the body of water, which in most cases is very impractical.

Another object of this invention is to provide a device of the character described wherein the kite may be reversed by switching the air tank and the weight, to adapt this kite for changes in direction of current, or for use from another bank of the body of water in which this kite is to be used.

A further object of this invention is to provide a device wherein the leaders with the hooks on the end, may be brought to shore one at a time so that the fisherman can remove any fish caught by these hooks without the necessity of disturbing the kite itself.

Yet a further object of this invention is to provide a simple and inexpensive device and yet one which is extremely effective for the purpose for which it is designed.

This invention contemplates the use of an elongated stabilizer I-shaped in cross section, with an air tank affixed to the upper portion thereof, and a weight affixed to the bottom thereof. Bridles which are connected to the stabilizer are also connected to an adapter ring at a point spaced from the stabilizer. Various lines from the shore which are wound upon reels, are connected to the adapter, so that the kite may be moved toward and away from the shore. One of these lines is equipped with leaders trailing therefrom with fishing hooks connected on the ends of said leaders, so that a plurality of fishing stations are established with the single kite. The reels are mounted on a platform which may be pivotally mounted upon a stake, so that as the position or angle of the kite changes, the platform will remain parallel thereto at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational plan view illustrating the device as it would be used in position for fishing;

Figure 2 is a perspective view of the kite comprising the present invention;

Figure 3 is an enlarged vertical sectional view taken substantially along the plane defined by reference line 3—3 of Figure 2 illustrating details of construction thereof;

Figure 4 is a perspective view of one of the stabilizer sections;

Figure 5 is a side elevational view illustrating an attachment of the bridles where a greater strength is necessitated, as when using the kite in a swift current;

Figure 6 is an elevational view of the retaining hooks which are used to hold the lines apart and prevent tangling with the leaders;

Figure 7 is a perspective view of the reels illustrating a platform and stake upon which they are mounted; and Figure 8 is an elevational view of the ring adapter which fastens the bridles to the main lines.

Referring now more specifically to the drawings, the numeral 10 generally designates the kite comprising a vertical stabilizer 12, a float or air tank 14, and a sinker or weight 16. The stabilizer 12 is constructed of three substantially identical sections 18, 20, and 22 which facilitate the disassembling and storing of this kite. Since all of the sections are substantially identical only section 18 will be described.

Section 18 is constructed of a flat vertical panel 24 having a narrow upper flange 26 connected to the upper end thereof, and a lower flange 28 connected to the lower end thereof, these flanges being parallel to each other and perpendicular to panel 24, so that each section has a cross section which is substantially I-shaped, as may be seen more clearly in Figure 3. The lower flanges have a plurality of openings 30 formed therein to facilitate attachment to the weight 16, and similar openings 30 are formed through the upper flange 26 to facilitate attachment to the air tank 14.

The weight 16 is constructed of a substantially solid elongated body 32 having an undercut channel 34 formed in the upper end thereof, to accommodate the lower flange 28 therein. Lips 35 extend inwardly and oppose each other, with a space left therebetween to accommodate panel 24. These lips 35 cover the upper surface of lower flange 28 so as to securely and firmly hold the flange therein. Threaded openings are formed in preselected positions through the lips 35, and bolts 36 are passed through the openings 35 and into the openings 30 which are aligned therewith, so as to positively engage the stabilizer sections to the weight 16.

Air tank 14 comprises a hollow cylinder 38 having an air chamber 40 formed therein. A reinforced portion 42 is formed along the bottom of the air tank, so as to allow a longitudinal undercut channel 44 to be formed therein, which slot is similar in size and shape to slot 34 formed in weight 16, so that the upper flange 26 may be engaged therein and locked positively to the air tank 14, by means of lips 45 which engage the lower surface of upper flange 26, and also bolts 46 which are passed through suitable openings formed in the lips 45 and are threaded into aligned openings 30. The front portion of the air tank 14 has a tapered conical nose 48. An identifying flag 50 is fixed to a rod 52 which projects upwardly from the forward portion of air tank 14, so that a fisherman on the shore may determine the exact location of the kite, and readily determine the direction of the wind which may be found by inspection of a direction in which the flag 50 is pointing. The air tank 14 is sealed by a circular rear wall 54.

A plurality of eyes 56 are affixed to the stabilizer sections at various positions, and as may be seen in Figure 2, two of the eyes 56 are fastened in the front end of section 18, and one of the eyes 56 is fastened in the rear of section 20. Two forward bridles 58 are connected to the eyes 56 in section 18, while a rear bridle 60 is connected to the eye in section 20. The bridles are connected to a three-ring adapter 62 which embodies first, second and third rings 64, 66 and 68, respectively, which are fastened together. The bridles (Figure 2) are fastened to the first ring 64.

In the event that a swift current is to be encountered and great force to be applied to the kite 10, then a stronger bridle arrangement will be needed. This bridle construction is illustrated in Figure 5, wherein two of the eyes 56 are connected to section 18, while the other two eyes are connected to the rearward portion of section 22. In this construction there are two forward bridles 58 as in the previous case, however, there are two rearward bridles 60, all of these bridles being connected to the first ring 64 of the adapter 62.

In order to attach the kite to the shore, several lines must be used, and each line is attached to an individual reel 70 upon which it may be wound. These reels 70 are mounted upon a platform 72 which is in turn mounted upon a stake 74. It is to be noted that the platform 72 may either be fixedly connected to stake 74, or pivotally connected thereto for a purpose which will be described below. The stake 74 is tapered inwardly and downwardly so as to be more easily inserted into the ground. The lower end of stake 74 has a metal tip 76 thereon for easy insertion into the ground.

One end of a main or control line 78 is wound on the middle reel 70. The other end of this control line is tied or otherwise connected to the third or inboard ring 68 of the adapter 62. Thus, when the central or middle wheel 70 is employed to wind or reel the lines 78 thereon, the kite 10 will be pulled toward shore using reel 70, in an obvious manner. When the control line 78 is paid out the kite 10 will obviously be permitted to move a distance farther from the shore. In addition to the control line 78 there is a second line. This line has one inboard end thereof, that is the end of the portion 80 wound on one of the end reels 70. The median portion is passed slidingly through the central or middle ring 66 of the adapter. The other inboard end of the line portion 84 is connected with the remaining end reel 70 and the cooperating portions of the two line portions 80 and 84 are connected by way of a cork or an equivalent stopper 82. It follows that the unitary three-ring adapter provides a novel coupling or connection between the bridle means and the short regulated lines. That is to say, the briddle means is tied or connected in any manner to the outermost ring, the line 78 to the innermost ring and the slidable portion of the second line is freely actuatable by properly controlling the reels by way of the center ring.

Retaining hooks 90 having eye portions 92 and elongated loop portions 94 are used to prevent the line portion 80 from being carried near the leaders on line portion 84. The loop 94 is clamped fast on main line 78 at selected distances, while the line portion 80 is set in the eye 92 in order to allow it a free run.

In use, the kite 10 would be allowed to float a sufficient or required distance from the shore, after which the stake 74 would be engaged into the ground. Then, the stopper 82 would be reeled toward the shore with a resulting unreeling of line 80, so that the kite will remain in position while the stopper 82 will come toward the shore. Then, the leaders 86 may be attached to the line 84 in loop knots made up at selected distances when attaching the leaders, so that the leaders cannot slide on the line 84, and the stopper 82 moved, in increments, toward the kite so that a plurality of these leaders 86 may be affixed to line 84, as by means of slip knots. The hooks may be baited and it can be seen that a plurality of these leaders and hooks 86 and 88 may be used. The several hooks can each be baited with a different bait, which gives greater versatility and variety to the fisherman. Any time a fish is caught on one of the hooks, it is not necessary to pull the kite 10 toward shore, but merely necessary to manipulate the lines 80 and 84 so that stopper 82 is moved toward the shore, after which the fish may be removed and the hook rebaited and subsequently the stopper 82 may be moved outwardly toward the kite again. This results in a great saving of time, in that the kite need not be removed in order to rebait the hooks or to remove any of the fish which are caught on the hooks. In surf fishing, where there is little or no tide motion, fishermen working in groups of two may fasten the stake 74 to a car driven at a slow speed, and the car may be driven for miles along the shore combing the waters for fish. In this way, fishermen, may without necessity of deep sea equipment, fish in relatively deep water without ever leaving the shore. If the current changes direction, or it is desired to fish from the opposite bank, it is merely necessary to remove air tank 14 and the weight 16 and exchange the positions of the two, so that the kite will be reversed.

It may now be seen that a new and improved type of sea fishing kite has been described which is extremely useful and practical, and which obviates the problem of pulling the kite to shore each time it is required that the fisherman gain access to any of the hooks.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Fishing tackle comprising, in combination, a kite provided with bridle means, an adapter connected at one end to the bridle means, a short regulated control line having an outboard end attached to said adapter, a second line having a median portion slidingly connected with said adapter, having one end portion disposed alongside of said control line and separably connected thereto in a manner which permits relative movement of the lines, and having a companion portion which is independent and provided with a plurality of hook-equipped leaders, there being a stop on said median portion cooperable with said adapter and which limits the sliding movement of the median portion through the adapter in a predetermined manner and direction, a portable base, and reel means mounted on said base, the ends of said lines adjacent said reel means being operatively connected with said reel means.

2. The structure defined in claim 1 and wherein said base is provided with a stake which may be removably anchored in the ground.

3. The structure defined in claim 1 and wherein said base is provided with a stake which may be removably anchored in the ground, said reel means comprising several individual selectively actuatable reels which may be utilized to handle and regulate the relative movement of the lines according to the various fishing requirements to be undertaken.

4. The structure defined in claim 3 and wherein said kite comprises a body portion having an upper lengthwise edge provided with a removably mounted float, and having a lower edge portion provided with a removably mounted weight constituting a keel.

5. Deep sea fishing tackle comprising, in combination, a kite embodying a body portion provided with a top part carrying a detachably mounted float and with the bottom part carrying a detachably mounted weight and serving as a keel, said kite being provided on at least one side with bridle means, a three-ring adapter embodying an outer ring to which said bridle means is connected, further embodying an inner ring and an intervening central ring, a base provided with a plurality of individually selectively actuatable reels, a primary control line having an inner end mounted on and controlled by one of said reels and an outer end connected to the innermost ring of said adapter, a second line having a median portion slidably mounted in the central ring, one end of said second line being operatively connected with one of said reels, and the corresponding other end of said line being operatively connected with the other reel whereby, through the medium of the several reels, the lines may be utilized to control the kite from the shore while one portion of the second line is utilized as a carrier for a plurality of hook-equipped leaders.

References Cited in the file of this patent
UNITED STATES PATENTS

| | | |
|---|---|---|
| 1,163,193 | Althoff | Dec. 7, 1915 |
| 2,769,271 | Smith | Nov. 6, 1956 |